(12) United States Patent
Valle

(10) Patent No.: US 6,986,723 B2
(45) Date of Patent: *Jan. 17, 2006

(54) FRONT BICYCLE DERAILLEUR

(75) Inventor: Maurizio Valle, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 213 days.

This patent is subject to a terminal disclaimer.

(21) Appl. No.: 10/394,321

(22) Filed: Mar. 21, 2003

(65) Prior Publication Data

US 2003/0228947 A1 Dec. 11, 2003

Related U.S. Application Data

(63) Continuation-in-part of application No. 09/951,548, filed on Sep. 14, 2001, now Pat. No. 6,641,495.

(30) Foreign Application Priority Data

Sep. 15, 2000 (IT) .......................... TO2000A0870

(51) Int. Cl.
F16H 61/00 (2006.01)

(52) U.S. Cl. ......................................... 474/80; 474/82

(58) Field of Classification Search ............ 474/80–82, 474/78

See application file for complete search history.

(56) References Cited

U.S. PATENT DOCUMENTS

| 4,305,712 A | * | 12/1981 | Nagano | 474/82 |
| 4,955,849 A | * | 9/1990 | Nagano | 474/80 |
| 4,961,720 A | * | 10/1990 | Juy | 474/80 |
| 5,624,336 A | | 4/1997 | Kojima | |
| 5,728,018 A | | 3/1998 | Terada et al. | |
| 5,779,581 A | * | 7/1998 | Fujii | 474/82 |

FOREIGN PATENT DOCUMENTS

| EP | 0545322 A1 | * | 6/1993 |
| FR | 1.1188883 | * | 3/1956 |
| FR | 2532608 A1 | * | 3/1984 |
| FR | 2621968 A3 | * | 4/1989 |
| FR | 2797841 A1 | * | 3/2001 |
| JP | 06-247376 A1 | * | 9/1994 |

* cited by examiner

Primary Examiner—Marcus Charles
(74) Attorney, Agent, or Firm—Volpe and Koenig, P.C.

(57) ABSTRACT

A bicycle derailleur having a derailleur fork. The inner plate of the fork according is made of light alloy, while the outer plate is made of fibre-reinforced synthetic resin. A rear bridge having interlocking portions connects the inner and outer plates.

5 Claims, 3 Drawing Sheets

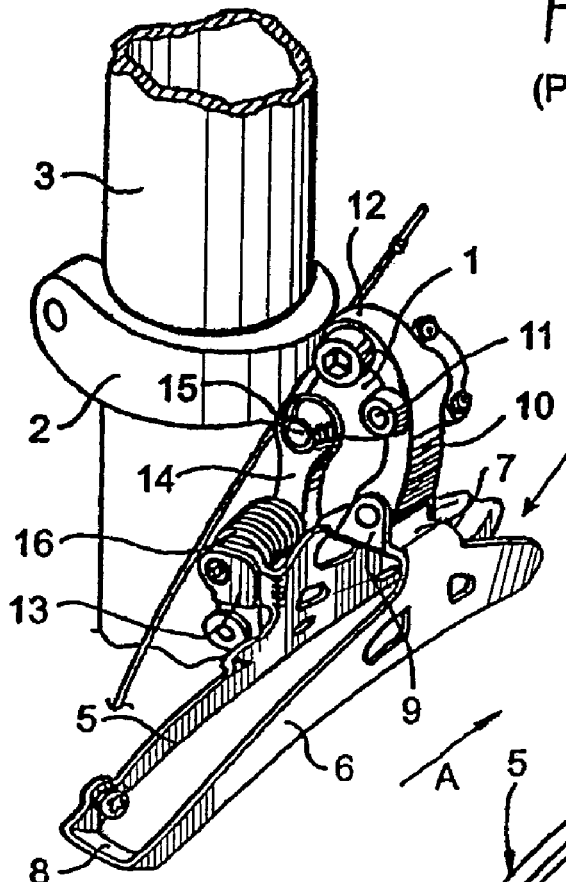
Fig_1 (PRIOR ART)
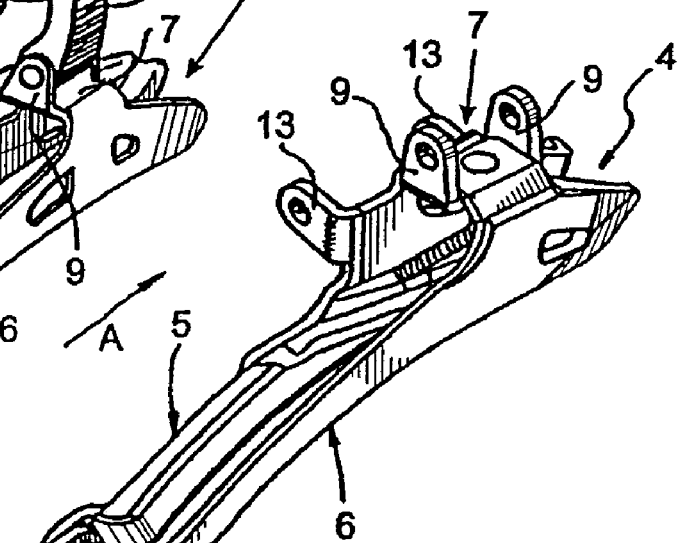
Fig_2
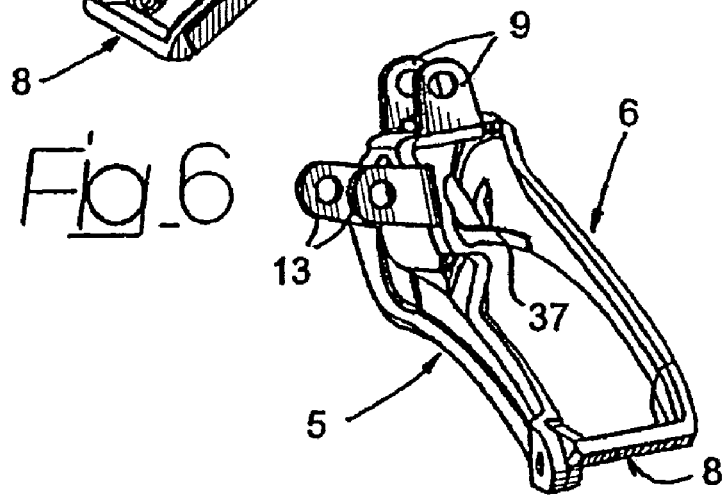
Fig_6

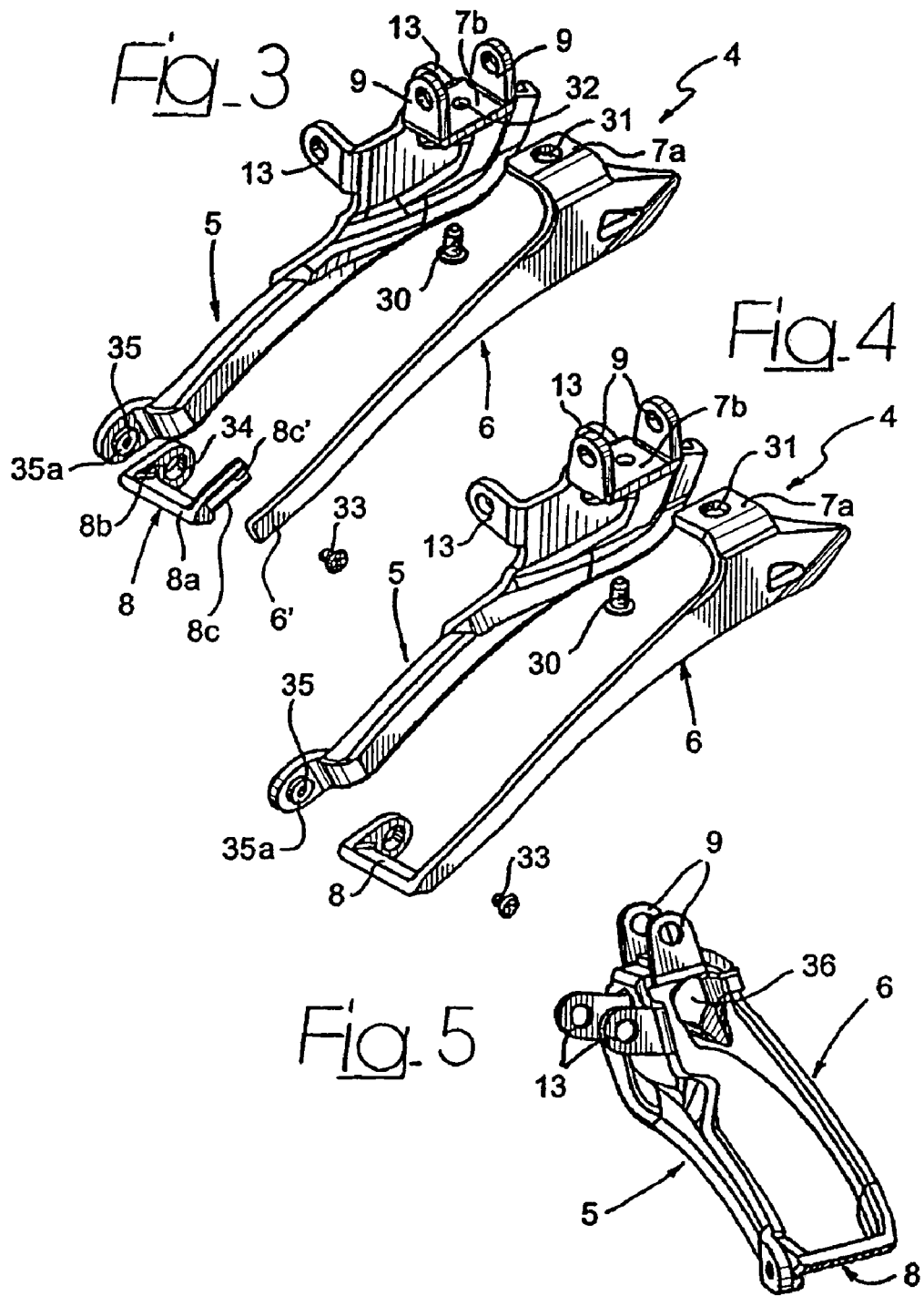

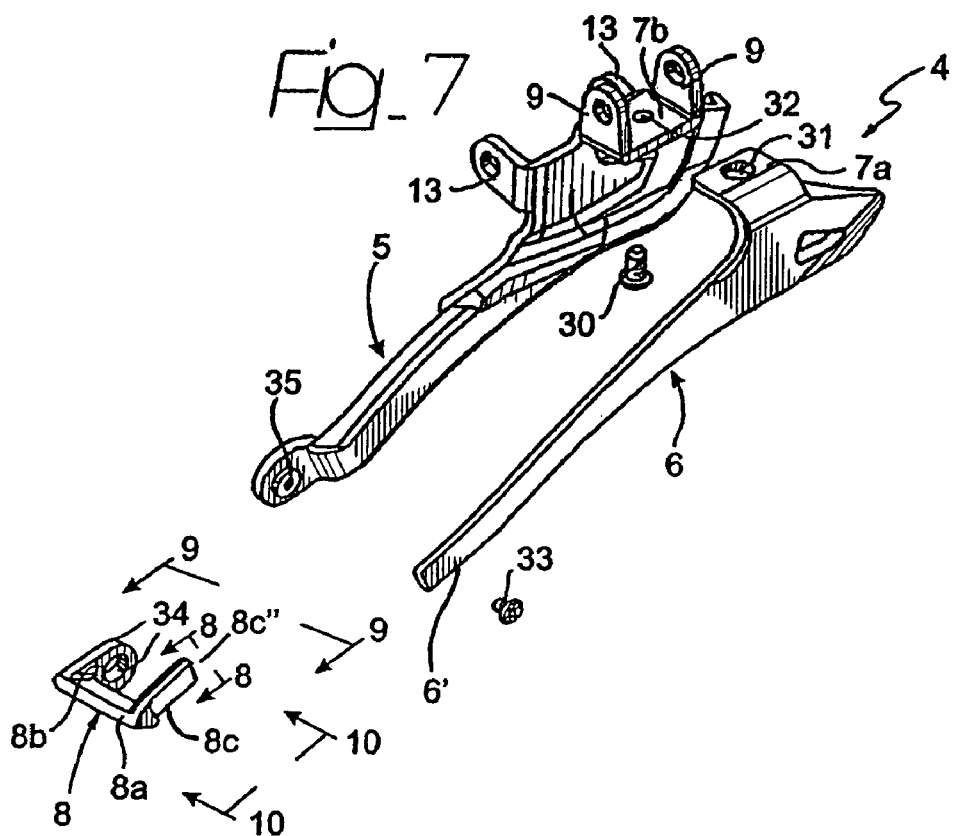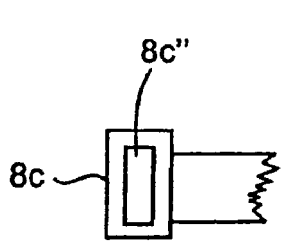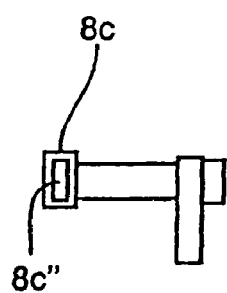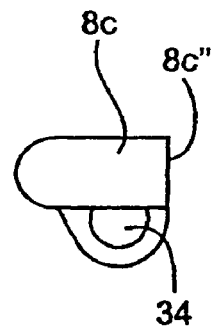

FRONT BICYCLE DERAILLEUR

CROSS REFERENCE TO RELATED APPLICATIONS

This application is a continuation-in-part of U.S. Pat. No. 6,641,495, filed Sep. 14, 2001, which issued on Nov. 4, 2003, which is incorporated by reference as if fully set forth, which in turn claims priority from Italian Patent Application TO2000A000870.

BACKGROUND

This invention relates to a front bicycle derailleur fork for controlling the selective engagement of a transmission chain of a bicycle on a plurality of chainrings of different diameters associated to the bottom bracket of the bicycle, said fork comprising an inner plate and an outer plate, which is essentially parallel and distanced with respect to the inner plate, and joined to it by an upper bridge portion, said outer plate being located on the side of the larger diameter chainring and said inner plate being located on the side of the smallest diameter chaining.

FIG. 1 of the annexed drawings shows a perspective view of a front bicycle derailleur of the traditional type, comprising a fixed body 1 with a fork 2 for anchoring to a tube 3 of the bicycle frame near the bottom bracket. The derailleur 1 also comprises a fork 4 for controlling the selective engagement of the bicycle chain (not illustrated) on the chainring (not illustrated) associated to the bottom bracket. The fork 4 comprises an inner plate 5, closer to the bicycle frame, and an outer plate 6, facing outwards, which is parallel and distanced with respect to the plate 5. The two plates 5, 6 are connected by an upper bridge 7 and a rear bridge 8. The upper bridge 7 is provided with a pair of parallel tabs 9 for the articulated connection to a rocker arm 10, which is articulated to the fixed body 1 of the derailleur in point 11 and presents an opposite end 12 for anchoring the end of the derailleur actuating flexible wire (not illustrated). The inner plate 5 also presents a pair of parallel tabs 13 for the articulated connection to a second articulated arm 14, whose opposite end is connected in an articulated fashion to the fixed body 1 in point 15. The two arms 10, 14, consequently, define an articulated parallelogram connection, which allows the fork 4 to move with respect to the fixed body 1 in a direction which is essentially transversal with respect to the longitudinal direction of the bicycle, indicated by the arrow A. A spring 16, which tends to recall the fork 4 forwards an end of travel position (leftwards with reference to the drawing), is provided on the spindle of the inner plate 4 and the arm 14. From this position, the fork can be moved rightwards (always with reference to FIG. 1) following the intervention of a derailleur control (not illustrated) whereby pulling the arm 10 by means of the flexible wire connected to the end 12.

In this description and in the claims which follow, the expressions "inner plate" and "outer plate" refer to the usual assembly condition of the front bicycle derailleur. According to the traditional assembly arrangement, the set of chainrings associated to the bottom bracket of the bicycle is arranged to the right of the bicycle frame with the largest diameter outside and the smallest on the inside. Similarly, the fork 4 presents an inner plate 5 facing the bicycle frame and an outer frame 6 facing outwards with respect to the bicycle.

It is essential to note that during the front derailleur operation, one of the two plates 5, 6 of the derailleur pushes the chain laterally to shift it from the chainring it is meshed with to the next chainring. More precisely, the lateral pushing action of the chain is exerted by the inner plate 5, when the chain is shifted from a smaller diameter chainring to a larger diameter chainring, and by the outer plate 6, when the chain is shifted from a larger diameter chainring to a smaller diameter chainring.

SUMMARY

The objective of this invention is a front bicycle derailleur fork which is capable of working efficiently and reliably in all conditions of operation of the derailleur and which is simple and lightweight at the same time.

To attain this objective, this invention relates to a fork of the type illustrated at the beginning of this description, characterized in that said outer plate and said inner plate are two separate elements made of different materials. Preferably, the material of the inner plate is stiffer and harder and the material of the outer plate is lighter.

The fork according to this invention differentiates from those made according to the traditional technique, which are typically made of a single pressed and bent metal part.

Studies and experiments conducted by the Applicant have ascertained that the fork structure can be optimized, both in terms of simplicity and lightness, considering that, for the reasons illustrated above, the outer plate and the inner plate of the fork are called to perform different tasks. In practice, while a relatively stiffer and harder material is needed for the inner plate, since this plate is called to perform the more difficult task of shifting the chain "up" from a smaller diameter chainring to a larger diameter chainring, the material chosen for the outer plate can be softer and lighter.

According to a preferred form of embodiment, the inner plate of the fork according to this invention is made of light alloy, while the outer plate is made of fibre-reinforced synthetic resin, for example carbon fibre-reinforced synthetic resin.

In a first form of embodiment, the element forming the outer plate incorporates a rear bridge, connecting the rear ends of the inner plate and of the outer plate. In an alternative form of embodiment, on the other hand, a third element, which is separate from the two elements forming the inner plate and the outer plate, forms the rear connection bridge between the two plates.

The two elements forming the inner plate and the outer plate preferably incorporate respective upper plates, which overlap and are joined to form said upper connection bridge, the elements defining the outer plate and the inner plate being connected by the overlapping plates forming the upper bridge and by the rear ends, either directly, as in the case of the first form of embodiment described above, or indirectly, by means of the third element forming the rear connection bridge, in the case of the second form of embodiment described above.

In an additional form of embodiment of this invention, the inner surface of the outer plate of the fork is provided with an additional plate, projecting from the space between the inner plate and the outer plate, to locally decrease the width of this space.

According to another possible form of embodiment, the outer face of the outer plate can be provided with an additional anti-wear plate, made of metallic material.

BRIEF DESCRIPTION OF THE DRAWINGS

The present invention will be understood from a consideration of the drawings wherein like elements are designated by like numerals and wherein:

FIG. 1 is a perspective view of a front derailleur of a bicycle according to the traditional technique.

FIG. 2 is a perspective view of a front derailleur of a bicycle according to this invention.

FIG. 3 is a perspective exploded view of the fork shown in FIG. 2.

FIG. 4 is a variant of FIG. 3.

FIGS. 5, 6 illustrate two additional forms of embodiments of FIG. 2.

FIG. 7 illustrates an alternative form of the invention with the preferred rear bridge.

FIG. 8 is a section along the lines 8—8 of FIG. 7.

FIG. 9 is a front elevation along the lines 9—9 of FIG. 8.

FIG. 10 is a side elevation along the lines 10—10 of FIG. 9.

DETAILED DESCRIPTION OF THE PREFERRED EMBODIMENTS

In the illustrated forms of embodiment, the fork 4 according to this invention presents an inner plate 5 and an outer plate 6, which are two separate elements. The inner plate 5 is made of stiffer and harder material, typically light metal alloy of the type normally used for these parts. The outer plate 6, on the other hand, is made of a light material, typically fibre-reinforced synthetic resin, for example carbon fibre-reinforced synthetic resin. The two elements forming the plates 5, 6 are joined by the upper bridge 7 and the rear bridge 8. The upper bridge 7 consists of two plates 7a, 7b, which overlap (see FIG. 3), belonging to the two elements forming the plates 5, 6, respectively. The union is achieved by means of a rivet 30, which engages the holes 31, 32 in the plates 7a, 7b. In the case of the form of embodiment illustrated in FIGS. 2, 3, the rear bridge 8 consists of a third element, separate from the two elements forming the plates 5, 6, and made of light alloy or composite material. As clearly visible in FIG. 3, the rear bridge 8 presents a general U-shaped configuration with a central part 8a and two branches 8b, 8c fastened to the rear ends of the two plates 5, 6, respectively. The branch 8b has a hole 34 that aligns with a raised bushing 35a that surrounds the threaded hole (fastener receiver) 35. The branch 8b is fastened to the plate 5 by means of a screw 33, which engages a passing hole 34 in branch 8b and a threaded hole 35 in the plate 5. The branch 8c has an interlock 8c' which mates with the free end 6' of outer plate 6 to connect the inner and outer plates 5, 6 together. Alternatively, the rear end of the outer plate 6 can be fastened to the branch 8c of the bridge element 8 simply by clipping, or by means of a screw or rivet (not illustrated). The connection means herein described as non-limiting examples can be replaced by any other type of conventional connection, including adhesive.

The form of embodiment illustrated in FIG. 4 differs from that shown in FIGS. 2, 3 in that the rear bridge portion 8 is an integral part of the carbon fibre element forming the outer plate 6. For the rest, the structure of the fork is identical to that described above. In both cases, the tabs 9 and 13 belong to the metal alloy element defining the inner plate 5.

The alternative form of embodiment illustrated in FIG. 5 is essentially identical to that shown in FIGS. 2 and 3 and differs only in that the plate 6 presents an additional plate 36 on the inner face, with the purpose of locally decreasing the width of the space between the two plates 5, 6. The purpose is to ensure the correct shifting of the chain from a smaller diameter chainring to a larger diameter chainring, also with very narrow chains, such as those currently used with shifting units presenting a high number of sprockets (for example 10) on the hub of the rear wheel of the bicycle.

The alternative embodiment illustrated in FIG. 6 illustrates an arrangement having an anti-wear plate 37, for example made of metallic material, on the inner face of the outer plate.

With reference to FIGS. 7 through 10, there is illustrated a preferred rear bridge 8 which is a separate element from the outer plate 6. In this embodiment the rear bridge 8 includes an end with a recess 8c" which receives one free end 6' of the outer plate 6 and an end 34 which is mated to the inner plate 5. The free end is retained within the pocket or recess 8c" by the fact that the end 8b is secured to the end of inner plate 5 and connecting portion of the bridge is rigid enough to hole the ends relative to each other. In the current construction the end 6' is received into the recess 8c" for about one-half inch. In the preferred construction, the rear bridge 8 is molded of the same material as the outer plate 6.

Thanks to the constructions described above, the fork according to this invention presents a simple structure, is extremely light in weight and provides efficient and reliable performance.

Numerous changes can be implemented to the construction and forms of embodiments of the invention as defined by the following claims.

What is claimed is:

1. A bicycle derailleur fork comprising:
   an inner plate having first and second ends and an inner upper bridge, with one of the ends of the inner plate further defining a fastener receiving position;
   a bushing overlying the fastener receiving position;
   an outer plate having first and second ends and an outer upper bridge rigidly attached and aligned orthogonally thereto which extends in a direction to enable fastening to the inner upper bridge;
   a rear bridge, that extends between and spaces the plates, having first and second free ends, the first end defines an aperture larger than the bushing and the second free end defines a cavity that receives a free end of the outer plate; and
   a fastener that passes through the rear bridge and bushing apertures, is received in the fastener receiving position and retains the inner and outer plates together.

2. A derailleur fork for selectively derailing a transmission chain between chain rings on a bicycle having at least one down tube, located adjacent to the chain rings, that provides an attachment point for fixedly mounting a rigid derailleur body to the down tube, the derailleur fork comprising:
   an inner plate, attached to the fixed body at a first location so that it is aligned substantially parallel to the chain rings, having first and second ends and an inner upper bridge, rigidly attached and aligned orthogonally thereto and extending in a direction away from the down tube, with one of the ends of the inner plate further defining a fastener receiving position;
   a bushing overlying the fastener receiving position;
   an outer plate, attached to the fixed body at a second location displaced from the first location, aligned substantially parallel to and opposite the inner plate defining a chain receiving slot between the plates, and having first and second ends and an outer upper bridge rigidly attached and aligned orthogonally thereto which extends in a direction toward the down tube by a sufficient distance to enable removable fastening to the inner upper bridge;

a rear bridge having a generally transverse portion that extends between the plates, and first and second free ends, the first end defines an aperture larger than the bushing, the second free end defines that defines a cavity dimensioned to receive a free end the outer plate; and a fastener that passes through the rear bridge and bushing apertures and is received in the fastener receiving position.

3. The derailleur fork of claim 2 wherein the rear bridge is molded from a thermoplastic material.

4. The derailleur fork of claim 2 wherein the outer plate and the rear bridge are molded from a thermoplastic material.

5. The derailleur of claim 4 wherein the outer plate and the rear bridge are molded of the same material.

* * * * *